United States Patent [19]

Hasegawa

[11] 4,299,460
[45] Nov. 10, 1981

[54] AUTOMATIC FOCUSING UNIT FOR CAMERA

[75] Inventor: Iwao Hasegawa, Tokyo, Japan

[73] Assignee: Osawa Precision Industries, Ltd., Tokyo, Japan

[21] Appl. No.: 207,867

[22] Filed: Nov. 18, 1980

[30] Foreign Application Priority Data

Nov. 27, 1979 [JP] Japan .......................... 54-163223[U]

[51] Int. Cl.³ .............................................. G03B 3/10
[52] U.S. Cl. .................................... 354/25; 352/140; 354/195
[58] Field of Search ................. 354/25, 195; 352/140; 355/56

[56] References Cited

U.S. PATENT DOCUMENTS 4,183,640 1/1980 Abe ...................................... 354/25

Primary Examiner—Michael L. Gellner
Attorney, Agent, or Firm—Edwin E. Greigg

[57] ABSTRACT

An automatic focusing unit of the invention is detachably mounted on a camera having a focusing tube which is adjustable to focus photographic lens on an object to be photographed. The automatic focusing unit includes a lens position detector which is urged to project outwardly from the housing of the unit and come into contact with the focusing tube to detect the position of the lens when the unit is mounted on the camera. The lens position detector is withdrawn into the housing of the unit against a biasing force when an external force is exerted thereon and successfully protected from any damage occurring from erroneous mounting of the unit on the camera.

3 Claims, 3 Drawing Figures

AUTOMATIC FOCUSING UNIT FOR CAMERA

BACKGROUND OF THE INVENTION

The present invention relates to an automatic focusing unit for camera, and more particularly to an automatic focusing unit suitably adapted for use with a photographic camera on which the automatic focusing unit is detachably mounted for the purpose of automatic lens focusing on an object to be photographed.

Various automatic focusing apparatus have been developed and utilized for electrically driven cameras, particularly motion picture cameras. One currently used type of automatic focusing apparatus for a camera is the "spatial image correlation" type, examples of which are described in Isono, U.S. Pat. No. 4,093,365 and the references cited thereto. Briefly, spatial image correlation systems include two optical systems: one which is stationary and one which scans a field of view which includes the object to be photographed. Light images formed by the optical systems are distributed onto respective detector arrays of light-responsive elements. A signal is produced when the light image of the object to be photographed is similarly distributed on both detector arrays. The signal is used to control the photographic lens for automatic focusing. In such an arrangement, a scanner which scans the field of view is driven oscillatably across an angle of the field to detect the object between infinity and the minimum focus condition of the objective lens and is adjustable in response to the focus condition of the lens whereby the bisector of the scanning angle is aligned with the object, as disclosed also in Isono, U.S. Pat. No. 4,123,765.

Such an automatic focusing system is usually disposed within the camera, but recently constructed in the form of a unit separately from the camera in an attempt to produce a small-sized and economical camera. When the automatic focusing is desired, the unit is mounted on the camera. For this purpose, the automatic focusing unit is provided with a lens position detector which projects outwardly from the housing of the unit and follows the displacement of a photographic lens to obtain the positional signal of the lens and feed it back to the unit for automatic focusing. Thus, there is a possibility that the lens position detector is pushed out of a focusing ring or tube and sometimes destroyed, when it is erroneously mounted on the camera without positioning the lens position detector on a predetermined position of the focusing tube.

To overcome this drawback, a proposal has been made in which a protector for protecting the lens position detector is provided to guide the latter to a predetermined position in the mounting of the automatic focusing unit on the camera. This proposal, however, has a similar drawback because there is the possibility that the lens position detector first hits against the ring or tube and can be damaged.

To eliminate these drawbacks completely, the following conditions must be fulfilled: (1) For the detector an escapement is provided to make the detector free from an unnatural force exerted thereon when it is mounted on the camera; and (2) Means is provided to retract the detector previously to a protected area.

Therefore, it is an object of the present invention to overcome those disadvantages and provide an automatic focusing unit for a camera which can protect its lens position detector from an unnatural force exerted thereon when it is mounted on the camera.

It is another object of the present invention to provide an automatic focusing unit for a camera which can previously retract its lens position detector into a safe area in its attachment on the camera.

SUMMARY OF THE INVENTION

According to one aspect of the present invention, an automatic focusing unit for a camera includes a lens position detector which is urged to project outwardly out of the housing of the unit and come into contact with a focusing ring or tube for adjusting the focus of a photographic lens to detect the axial displacement of the photographic lens for automatic focusing. The lens position detector is withdrawn into the housing of the unit when an external great force is exerted thereon and protected from any damage occurring from erroneous mounting of the unit on the camera. Further, according to a preferred embodiment of the present invention, a rockable lever is provided which has the lens position detector at its one end and is operable by an operating knob accessible from outside. The lens position detector together with the lever can previously be retracted by the operation of the knob into a space where it does not come into contact with any portion of the camera when the unit is mounted on the camera. Thus, the lens position detector can safely be protected from possible damages in a double manner.

BRIEF DESCRIPTION OF THE DRAWINGS

Further features and advantages of the invention will become more apparent from the following detailed description where reference is made to the accompanying drawings wherein.

DETAILED DESCRIPTION OF THE PREFERRED EMBODIMENTS

Figure 1:
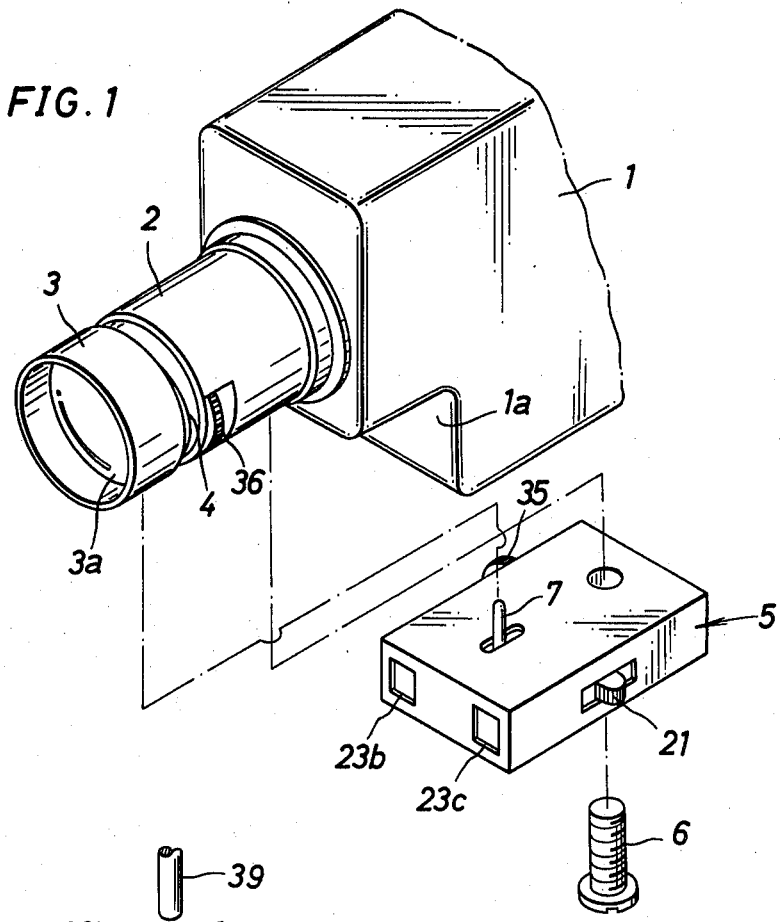
FIG. 1 is a schematic perspective view showing a photographic camera on which an automatic focusing unit is to be mounted.

In FIG. 1 there is shown a photographic camera, more particularly a motion picture camera having a camera body 1 and a stationary cylindrical tube 2 to which a focusing tube 3 is rotatably mounted relative to the stationary tube 2 for sliding movement of a focusable lens 3a along its optical axis in response to rotation of the focusing tube 3 for lens focusing on an object to be photographed. The focusing tube 3 is formed at its rear edge surface with a cam 4 whose surface changes in configuration along the optical axis. An automatic focusing unit is generally designated by the numeral 5 and detachably mounted on a cut section 1a of the camera body 1 with a screw 6. The unit 5 is provided with a detecting pin 7 serving as a lens position detector which projects upwardly out of the housing of the unit and comes into contact with the surface of the cam 4 when the unit is mounted on the camera body 1 to detect the position of the lens 3a which changes in position along the optical axis due to a focusing operation through the focusing tube 3.

Figure 2:
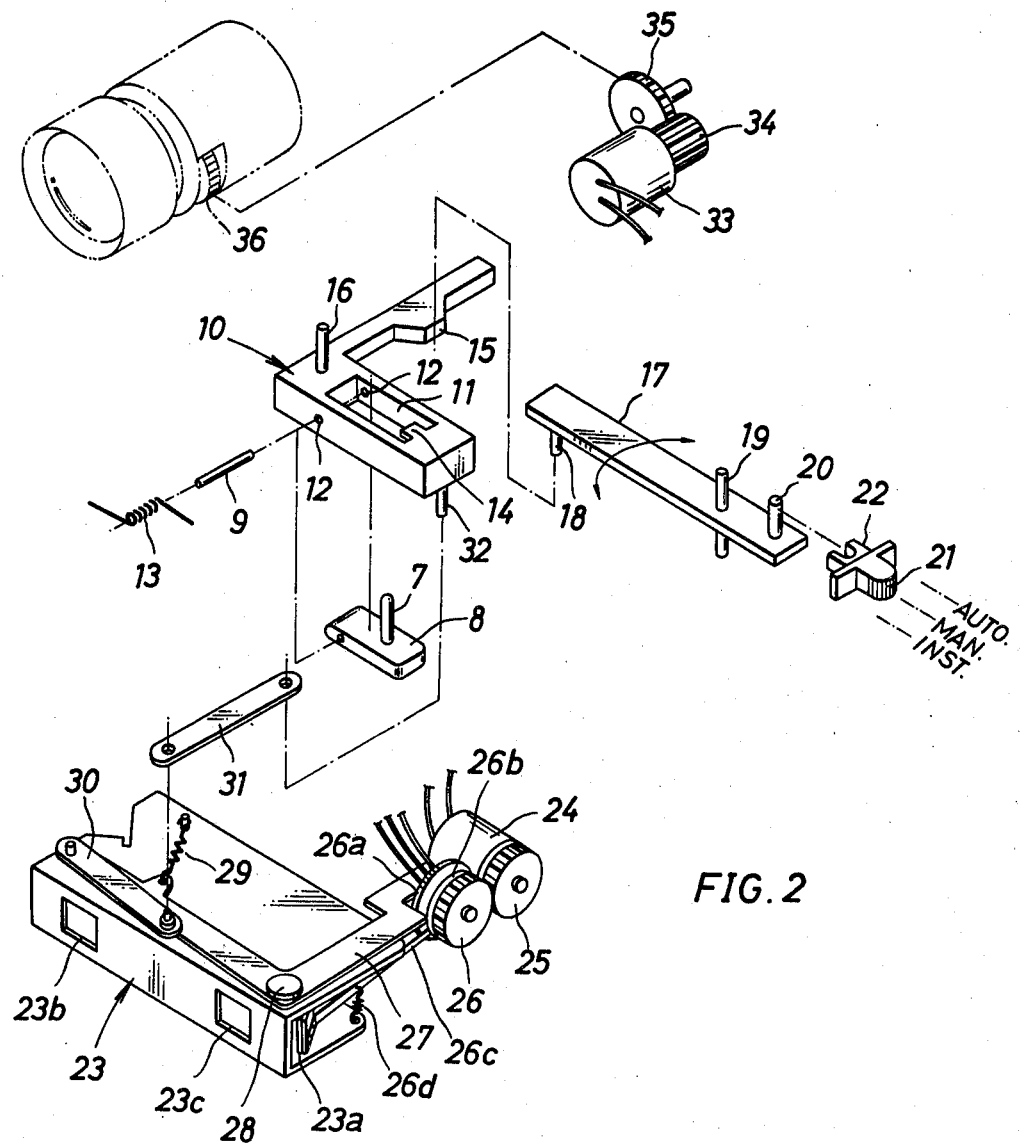
FIG. 2 is a schematic disassembled view of the unit showing its inner construction.

The detecting pin 7, as shown in FIG. 2, is fixedly supported on a block 8 which is pivotally mounted on a lever 10. The lever 10 is substantially L-shaped and resiliently urged in a clockwise direction in FIG. 2. The lever 10 is further formed at its one arm with a rectangular opening 11 which has a capacity to accommodate the block 8 and effect pivotal movement about pin 9 inserted through a small hole 12 at the side wall of the lever 10. A helical spring 13 is mounted on the pin 9 and supported at its end by a lever 10 and at the other end by the block 8. Thus, the block 8 is resiliently urged so as to effect counterclockwise pivotal movement about the pin 9 in FIG. 2 with its movement limited by a stopper 14 formed at the other end of the opening 11.

The lever 10, on the other hand, is formed at the other arm with a projection 15 and at its corner with a pin 16 about which the lever 10 pivots. An operating lever 17 is provided in the proximity of the projection 15 of the lever 10 and constructed in the form of an elongated plate. The operating lever 17 has at its one end a pin 18 extending downwardly and coming into contact with the surface of the projection 15 and carries at the other end a pin 19 about which the operating lever 17 pivots as shown by an double arrow. The operating lever 17 has at its end opposite to the pin 18 another pin 20 which extends into a U-shaped block 22 mounted on an operating knob 21 which extends out of the side wall of the automatic focusing unit 5 and therefore accessible from outside. The operating knob 21 takes three positions "AUTOMATIC", "MANUAL" and "INSTANTANEOUS". The automatic focusing unit 5 becomes valid in the "AUTOMATIC" position of the knob 21, invalid in the "MANUAL" position and functions instantaneously in the "INSTANTANEOUS" position.

The unit 5 further comprises an automatic focusing module, generally designated by the numeral 23 in FIG. 2, which includes a stationary mirror (not shown) and scanning mirror 23a each of which receives light from an object to be photographed through windows 23b and 23c, respectively. The module 23 further includes a lever 27 which is substantially L-shaped and pivotally mounted on a pin 28. The lever 27 is resiliently urged by a spring 29 so as to be turnable clockwise in FIG. 2 about the pin 28 and comes at one end thereof into fixed contact with the other end of a printed circuit board 26a. On the printed circuit board 26a there is rotatably mounted a cam 26b integral with a gear 26 which is engageable with a gear 25 and is rotated when a motor 24 is driven.

A rod 26c is provided which is fixed at one end thereof to the scanning mirror 23a and comes at the other end into contact with the surface with the cam 26b. The rod 26c is resiliently urged by a spring 26d to assure the contact of the rod 26c with the cam surface. When the motor 24 is driven, the cam 26b is rotated to oscillate the scanning mirror 23a about an axis (not shown) against the biasing force of the spring 26d to scan the field of view including the object to be photographed. The lever 27 is turnable about the pin 28 against the biasing force of the spring 29 to displace the board 26a together with the cam 26b, thereby biasing or changing the bisector of the scanning angle of the mirror 23a.

The lever 27 is further fixed at the other end to another lever 30, which is linked with the lever 10 through a link lever 31. Namely, the link lever 31 is pivotally mounted at a pin 32 which extends from the lower surface of the lever 10. The movement of the photographic lens 3a along its optical axis causes the detecting pin 7 to be displaced along the optical axis through the cam surface 4 and the lever 10 to be turned about the pin 16, thereby displacing the link lever 31 substantially along the optical axis. The axial movement of the link lever 31 then causes the lever 27 to be turned about the pin 28 against the biasing force of the spring 29 through the lever 30 to displace the bisector of the scanning angle, i.e., the center of angle of the field scanned by the scanning mirror 23a. Thus, the center of angle of the field scanned is directed substantially toward the object to be photographed when it is brought into focus.

A focusing signal produced by the module 23 is fed to a drive motor 33, which is disposed within the unit 5 and drives a gear 36 interconnecting with the focusing tube 3 through a pinion 34 and an idler 35 which partially extends out of the housing of the unit 5 for engagement with the gear 36 to adjust the focusing tube 3, thereby displacing the lens 3a along its optical axis for automatic focusing on the object. Thus, the automatic focusing unit 5 functions similarly to the previously mentioned automatic focusing system as disclosed in Isono, U.S. Pat. No. 4,123,765.

With such an arrangement, the automatic focusing unit according to the present invention can successfully be mounted on the camera body 1 by the use of the screw 6. Even if the detecting pin 7 is not successfully brought into contact with the cam surface 4 and hits against another side surface of the tube 2 or 3 in its mounting on the camera body, the block 8 is turned clockwise in FIG. 2 against the biasing force of the helical spring 13 to withdraw the detecting pin 7 into the housing of the automatic focusing unit 5, thereby protecting the detecting pin 7 and other associated parts without any damage.

The protection of the pin 7 in the mounting of the unit 5 on the camera body is further assured by retracting the detecting pin 7 previously into a neutral space by the use of the operating knob 21. More particularly, the operating knob 21 is slided into the "MANUAL" position to bring the operating lever 17 into the neutral position where the pin 18 rides on the projection 15 of the lever 10. The lever 10, always urged clockwise by a spring (not shown), now turns counterclockwise in FIG. 2 when the pin 18 rides on the projection 15. Consequently, the block 8 together with the detecting pin 7 is turned in a direction away from the cam 4 and the detecting pin 7 retracts into a space between the main stationary tube 2 and the focusing tube 3 where the detecting pin 7 does not touch with other side surfaces of the focusing tube 3 or other tubes. In this "MANUAL" position, the focusing of the lens 3a is manually controlled independently of the automatic focusing unit.

In this manual position, on the other hand, the operating knob 21 can be slided into the "AUTOMATIC" position for automatic focusing mode in which the operating lever 17 is turned counterclockwise in FIG. 2 about the pin 19 to remove the pin 18 from the projection 15 toward the corner of the L-shaped lever 10. As a result, the lever 10 is returned to the original position, in which the detecting pin 7 comes into elastic contact with the cam surface of the focusing tube 3. Thus, the detecting pin 7 can precisely detect the lens focusing position, i.e., the axial displacement of the focus tube 3 controlled by the signal from the automatic focusing module 23.

Further, the operating knob 21 can be moved leftwards in FIG. 2 into the "INSTANTANEOUS" position in which the operating lever 17 is turned clockwise in FIG. 2 about pin 19 to remove the pin 18 outside of the projection 15 of the lever 10 and bring the detecting pin 7 into contact with the cam 4. This allows the instantaneous automatic focusing in which the focusing condition at the time of operation of the knob 21 is set for the lens. The instantaneous automatic focusing mode is mechanically the same as the usual automatic focusing mode, but electrically different therefrom because circuitry is off after the automatic focusing is once established.

Figure 3:
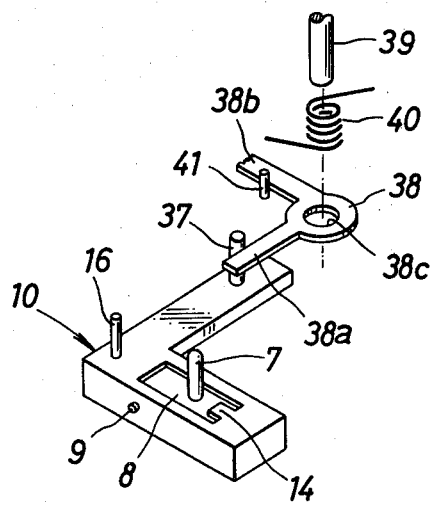
FIG. 3 is a schematic perspective view showing another embodiment of a protector for a lens position detector.

In FIG. 3 there is shown another embodiment of the automatic focusing unit in which the lens position detector can be retracted instead of using the operating knob 21 which takes the three "AUTOMATIC", "MANUAL", and "INSTANTANEOUS" mode positions. In the embodiment of FIG. 3 parts or portions similar to those of FIG. 2 are provided with the same numeral references as those of FIG. 2.

In this embodiment, the lever 10 has another pin 37 at the other end opposite to the end at which the detecting pin 7 is provided. In the proximity of the pin 37 there is provided a substantially L-shaped operating lever 38 which comes at its one end 38a into contact with the pin 37 and extends at the other end 38b outwardly out of the housing of the automatic focusing unit. The operating lever 38 is formed at its bending portion with a hole 38c into which a pin 38 is inserted. The pin 39 is provided with a helical spring 40 which causes the operating lever 38 to be urged in a direction where the end 38a of the pin 37 goes away from the pin 37.

In this arrangement, the operating lever 38 contacts against the stopper 41 at its end 38b and has its turning movement limited when the lever 38 is not operated. In this condition, the other end 38a of the operating lever 38 does not contact with the pin 37 with the lever 10 kept unchanged. Thus, when the automatic focusing unit is mounted on the camera body, the detecting pin 7 possibly hits at its top against the tubes, because it is not previously retracted. The detecting pin 7 or other portions nevertheless receives no damage because the block 8 is permitted to turn downwardly against the biasing force of the helical spring 13.

The clockwise turning operation of the operating lever 38 in FIG. 3 causes it to come into contact with the pin 37 and the lever 10 to be turned counterclockwise, thereby moving the detecting pin 7 into a safe area where it does not come into contact with any portion. The release of the lever 38, on the other hand, causes the detecting pin 7 to be brought into contact with the cam 4 to follow the movement of the photographic lens. In case where the automatic focusing unit is mounted on the camera with the operating lever 38 not released, the detecting pin 7 has no contact with any portion and receives a protection from any damage in a double manner.

It is to be noted that the embodiment as shown in FIG. 3 can be used separately from or together with the operation mechanism having the operating knob 21 as shown in FIG. 2.

As mentioned above, the automatic focusing unit according to the present invention includes the lens position detector which is always urged to project outwardly from the housing of the unit and withdrawn into the housing against the biasing force in response to an external force exerted thereon. Thus, even if the automatic focusing unit is mounted on the camera with its position detector not kept retracted, no damage against the lens position detector occurs in the mounting of the unit on the camera because the lens position detector successfully withdraws into the housing of the unit when it comes into contact with another portion of the focusing tube or other tubes. According to the invention, the operating lever or knob is provided to effect compulsory movement of the lever supporting the lens position detector to retract it previously into the area where it has no contact with the rings or tubes. This double safety protection assures no damage of the lens position detector.

While there have been described what are at present considered to be the preferred embodiments of the invention, it will be understood that various modifications may be made in the embodiments of this automatic focusing unit without departing from the essential concept of the invention.

What is claimed is:

1. An automatic focusing unit for a camera adapted to be detachably mounted on said camera which includes a focusing tube which is adjustable to focus a photographic lens on an object to be photographed, comprising a housing, a lens position detector which is urged to project outwardly from said housing and come into contact with said focusing tube to detect the position of said photographic lens when said unit is mounted on said camera, said lens position detector being withdrawn into said housing against an urging force when an external force is exerted thereon, and an automatic focusing module for producing a focusing signal in response to the position of said lens position detector depending upon a distance to said object to be photographed to control said photographic lens for automatic focusing.

2. An automatic focusing unit according to claim 1, wherein said lens position detector is mounted on a portion of a lever which is rockable by operating means accessible from outside to retract said lens position detector into a space where it does not come into contact with any portion of said camera.

3. An automatic focusing unit according to claim 2, wherein said lever is moved into three positions by said operating means, said lens position detector being brought into contact with said focusing tube for automatic focusing in a first position of said lever, into no contact with said focusing tube for manual focusing in a second position of said lever, and into contact with said focusing tube for instantaneously automatic focusing in a third position of said lever.

* * * * *